United States Patent
Cudak et al.

(10) Patent No.: US 9,606,725 B2
(45) Date of Patent: Mar. 28, 2017

(54) COLLABORATIVE OVERLAY OF USER INTERFACE ELEMENTS RENDERED ON THE DISPLAY OF A COMPUTING DEVICE

(71) Applicant: LENOVO ENTERPRISE SOLUTIONS (SINGAPORE) PTE. LTD., Singapore (SG)

(72) Inventors: Gary D. Cudak, Creedmoor, NC (US); Lydia M. Do, Raleigh, NC (US); Christopher J. Hardee, Raleigh, NC (US); Adam Roberts, Moncure, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 210 days.

(21) Appl. No.: 13/689,968

(22) Filed: Nov. 30, 2012

(65) Prior Publication Data
US 2014/0157159 A1    Jun. 5, 2014

(51) Int. Cl.
*G09G 5/14*        (2006.01)
*G06F 3/0488*     (2013.01)
*G06F 9/44*        (2006.01)

(52) U.S. Cl.
CPC ........ *G06F 3/04886* (2013.01); *G06F 9/4443* (2013.01); *G09G 5/14* (2013.01); *G06F 2203/04803* (2013.01); *G09G 2340/12* (2013.01); *G09G 2340/145* (2013.01)

(58) Field of Classification Search
CPC .... G06F 1/1613; G06F 3/0481; G06F 3/0482; G06F 9/4446; G06F 17/211; G06F 2200/1614; G06F 2200/1637; G06F 2203/04804; G09G 5/14; G09G 2320/0686; G09G 2340/14; G09G 2354/00

USPC ....... 715/765, 766, 790, 797, 799, 807, 863, 715/864; 345/173, 629
See application file for complete search history.

(56) References Cited

U.S. PATENT DOCUMENTS

| | | | |
|---|---|---|---|
| 4,555,775 A | 11/1985 | Pike | |
| 5,604,849 A | 2/1997 | Artwick et al. | |
| 5,734,380 A | 3/1998 | Adams et al. | |
| 5,757,268 A | 5/1998 | Toffolo et al. | |

(Continued)

OTHER PUBLICATIONS

Bell et al., "View Management for Virtual and Augmented Reality", In Proceedings of the 14th Annual ACM Symposium on User Interface Software and Technology (UIST '01), Nov. 2001, pp. 101-110, ACM, New York, NY, USA, DOI=10.1145/502348. 502363.

(Continued)

*Primary Examiner* — Jeffrey A Gaffin
*Assistant Examiner* — Rinna Yi
(74) *Attorney, Agent, or Firm* — Brandon C. Kennedy; Douglas W. Robinson; Kennedy Lenart Spraggins LLP

(57) ABSTRACT

Collaborative overlay of user interface elements rendered on the display of a computing device, including: identifying, by an overlay management module, one or more active elements of a user interface for a first application; selecting, by the overlay management module, a location on a user interface for a second application to place one or more of the active elements of the user interface for the first application; and displaying, by the overlay management module, the one or more of the active elements of the user interface for the first application at the selected location on the user interface for the second application.

20 Claims, 9 Drawing Sheets

(56) References Cited

U.S. PATENT DOCUMENTS

| | | | |
|---|---|---|---|
| 6,538,660 B1* | 3/2003 | Celi et al. | 345/592 |
| 6,710,789 B1 | 3/2004 | Sekiguchi et al. | |
| 7,788,600 B2 | 8/2010 | Lau et al. | |
| 7,940,285 B2 | 5/2011 | Would et al. | |
| 8,015,494 B1* | 9/2011 | Hull | G06F 9/4443 715/745 |
| 2004/0056900 A1 | 3/2004 | Blume | |
| 2006/0086022 A1* | 4/2006 | Would et al. | 40/584 |
| 2006/0161863 A1* | 7/2006 | Gallo | G06F 9/4443 715/810 |
| 2006/0230011 A1* | 10/2006 | Tuttle et al. | 706/62 |
| 2008/0163090 A1* | 7/2008 | Cortright | G06F 3/0481 715/771 |
| 2009/0005072 A1* | 1/2009 | Forstall | G01C 21/20 455/456.1 |
| 2010/0037261 A1* | 2/2010 | Ohta et al. | 725/40 |
| 2010/0110105 A1* | 5/2010 | Kinnunen | G01C 21/20 345/629 |
| 2010/0153876 A1* | 6/2010 | Kim et al. | 715/800 |
| 2012/0194549 A1 | 8/2012 | Osterhout et al. | |

OTHER PUBLICATIONS

Office Action, U.S. Appl. No. 13/707,877, Jan. 8, 2015, pp. 1-12.

* cited by examiner

COLLABORATIVE OVERLAY OF USER INTERFACE ELEMENTS RENDERED ON THE DISPLAY OF A COMPUTING DEVICE

BACKGROUND OF THE INVENTION

Field of the Invention

The field of the invention is data processing, or, more specifically, methods, apparatus, and products for collaborative overlay of user interface elements rendered on the display of a computing device.

Description of Related Art

On computing devices with small display screens, such a smart phone, the display area of the computing device can be limiting. Many times during operation of such a computing device, an application that is executing on the computing device has access to the entire display area of the computing device, thereby preventing all other applications executing on the computing device from having their interfaces displayed on the display area. This can be problematic as a user is only able to visually examine the user interface of one executing application at a time. For many computing devices, the display area is limited in size such that tiling windows is not sufficient.

SUMMARY OF THE INVENTION

Methods, apparatus, and products for collaborative overlay of user interface elements rendered on the display of a computing device, including: identifying, by an overlay management module, one or more active elements of a user interface for a first application; selecting, by the overlay management module, a location on a user interface for a second application to place one or more of the active elements of the user interface for the first application; and identifying, by an overlay management module, one or more active elements of a user interface for a first application; selecting, by the overlay management module, a location on a user interface for a second application to place one or more of the active elements of the user interface for the first application; and displaying, by the overlay management module, the one or more of the active elements of the user interface for the first application at the selected location on the user interface for the second application.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
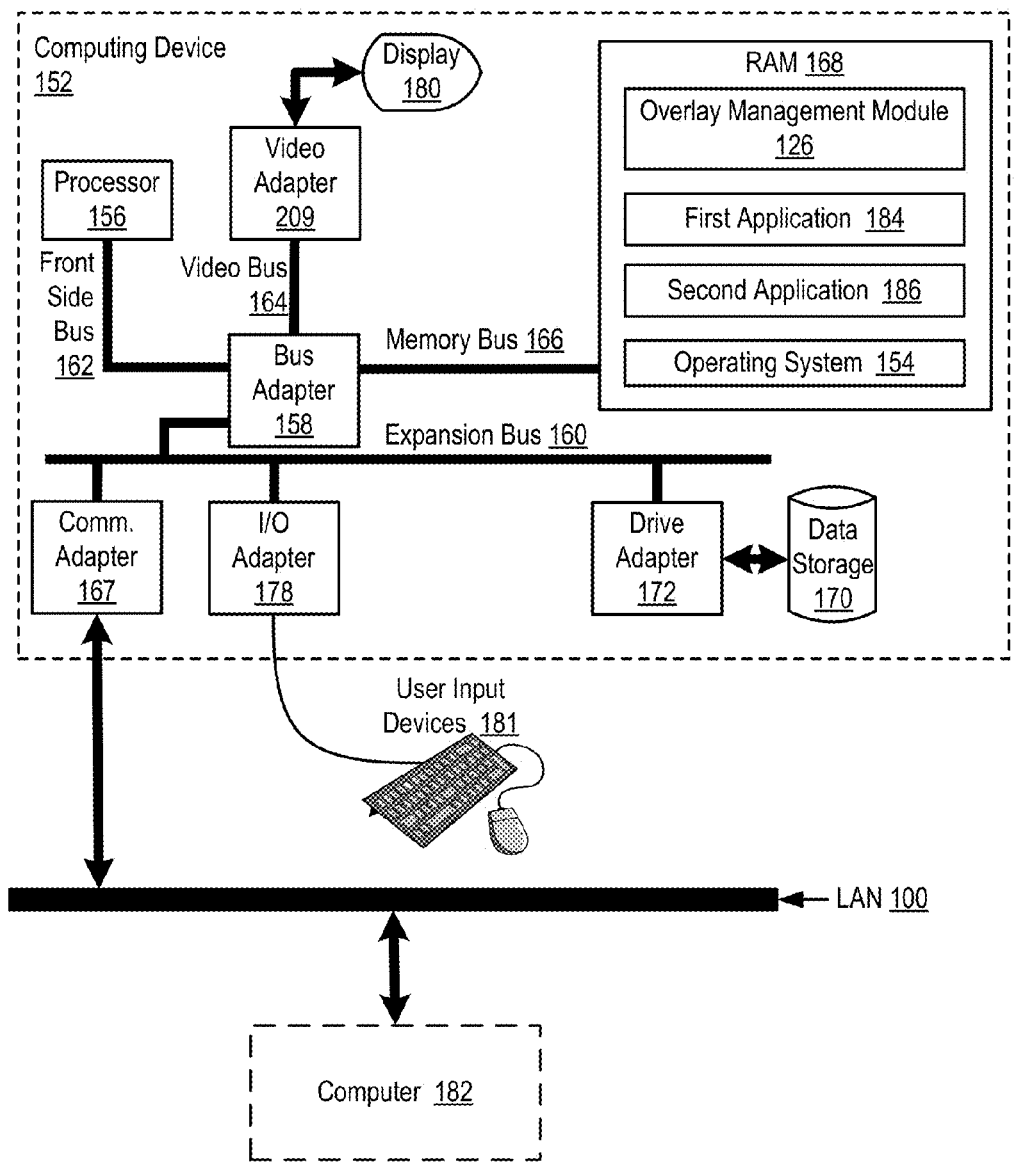
FIG. 1 sets forth a block diagram of automated computing machinery comprising an example computing device useful in collaborative overlay of user interface elements rendered on the display of the computing device according to embodiments of the present invention.

Example methods, apparatus, and products for collaborative overlay of user interface elements rendered on the display of a computing device in accordance with the present invention are described with reference to the accompanying drawings, beginning with FIG. 1. FIG. 1 sets forth a block diagram of automated computing machinery comprising an example computing device (152) useful in collaborative overlay of user interface elements rendered on the display (180) of the computing device (152) according to embodiments of the present invention. The computing device (152) of FIG. 1 includes at least one computer processor (156) or 'CPU' as well as random access memory (168) ('RAM') which is connected through a high speed memory bus (166) and bus adapter (158) to processor (156) and to other components of the computing device (152).

Stored in RAM (168) is an overlay management module (126), a module of computer program instructions for collaborative overlay of user interface elements rendered on the display (180) of the computing device (152) according to embodiments of the present invention. In the example of FIG. 1, the overlay management module (126) can carry out collaborative overlay of user interface elements rendered on the display (180) of the computing device (152) by identifying one or more active elements of a user interface for a first application (184). In the example method of FIG. 1, the first application (184) may be embodied as any computer program application that can be executed on the computing device (152). The one or more active elements of a user interface for the first application (184) can include those elements of the user interface that facilitate dynamic interaction between a user of the first application (184) and the first application (184) itself. For example, the one or more active elements of the user interface can include control elements of the user interface that are used to initiate some such of action. Examples of such control elements could include a 'play' icon for a music playing application, a text box for entering an address into a mapping application, and so on. The one or more active elements of a user interface can also include portions of the user interface that are dynamically updated. Examples of portions of the user interface that are dynamically updated can include a portion of mapping application that displays a map that periodically updated, a portion of a video rendering application that displays the video content, and so on.

The overlay management module (126) can identify one or more active elements of a user interface for the first application (184), for example, by examining the source code for the user interface for the first application (184). The source code may include clickable elements that are used to invoke some action. In such an example, the clickable elements that are used to invoke some action may be determined to be active elements by virtue of their ability to control what is displayed in the user interface. Alternatively, identifying one or more active elements of a user interface for a first application (184) may also be carried out by monitoring the content presented by the user interface to identify those portions of the user interface that include content that is updated periodically. In such an example, the portions of the user interface that include content that is updated periodically may be determined to be active elements by virtue of the fact that they are dynamically updated to present some information to a user.

Figure 2:
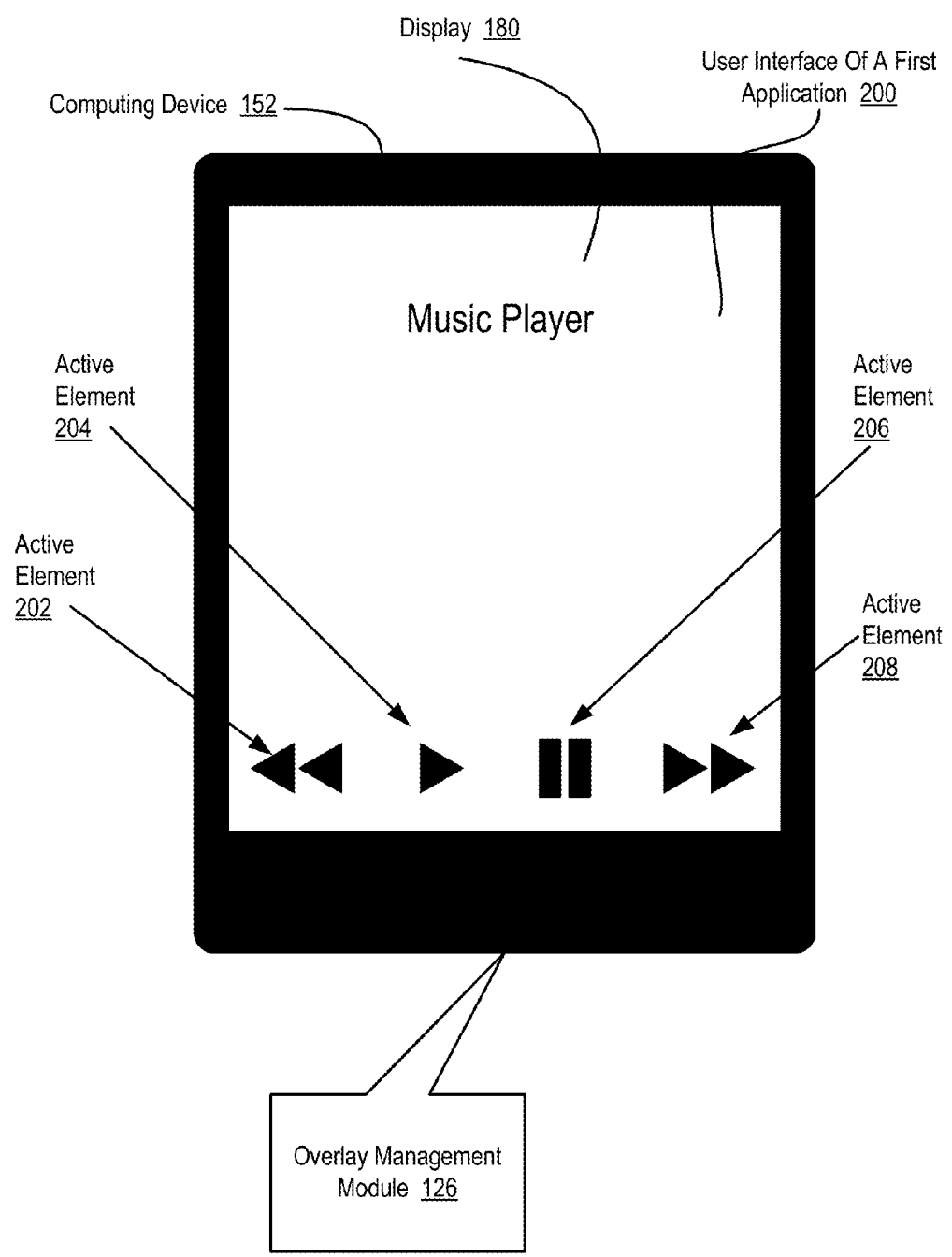
FIG. 2 sets forth a diagram of a computing device configured for collaborative overlay of user interface elements rendered on the display of the computing device according to embodiments of the present invention.
Figure 3:
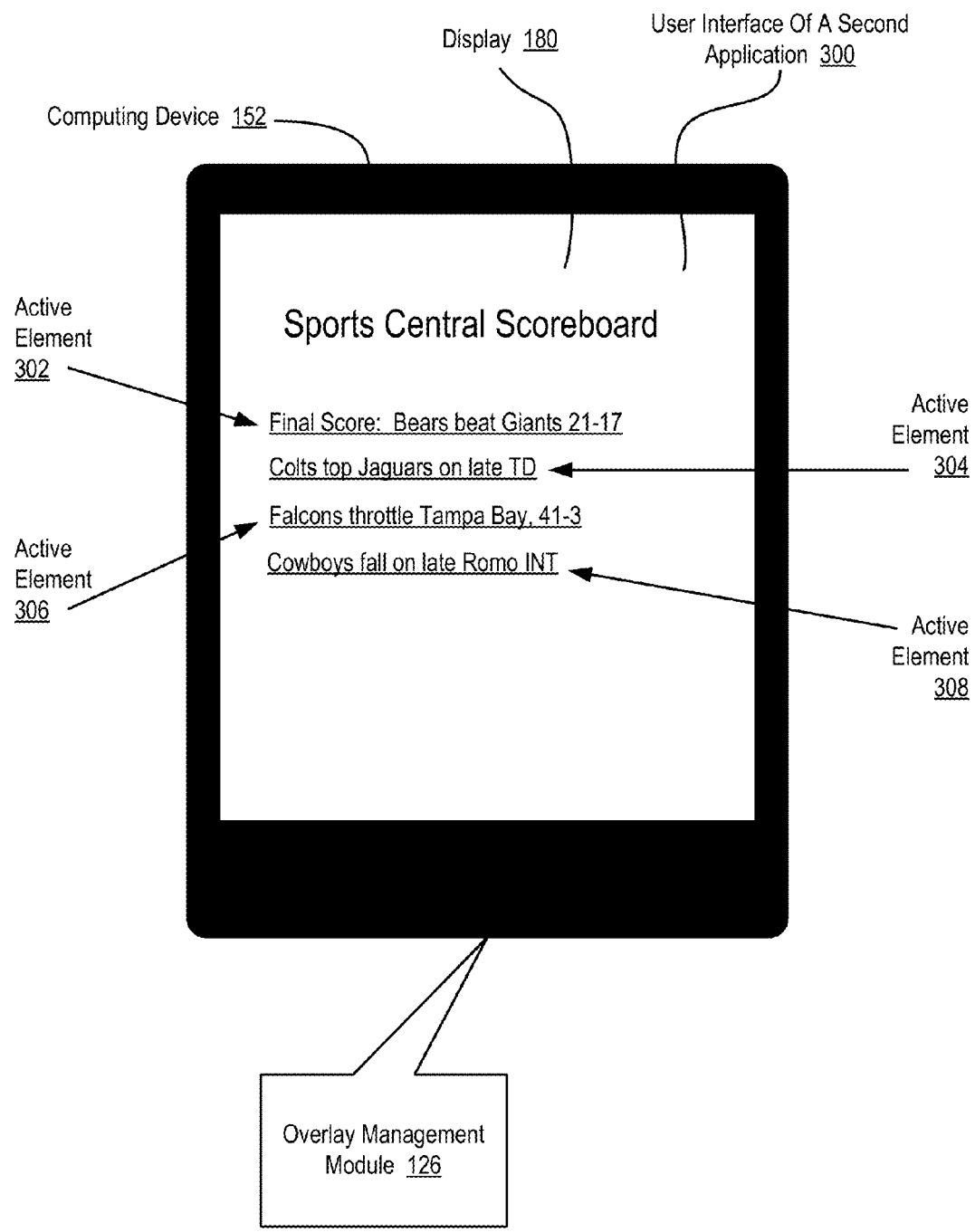
FIG. 3 sets forth a diagram of a computing device configured for collaborative overlay of user interface elements rendered on the display of the computing device according to embodiments of the present invention.

In the example of FIG. 1, the overlay management module (126) can further carry out collaborative overlay of user interface elements rendered on the display (180) of the computing device (152) by selecting a location on a user interface for a second application (186) to place one or more of the active elements of the user interface for the first application (184). In the example of FIG. 1, the second application (186) may be embodied as any computer program application that can be executed on the computing device (152). The user interface for the second application (186) and the user interface for the first application (184) are designed to be displayed in overlapping portions of the display (180) for the computing device (152). For example, the user interface for each application (184, 186) may be designed to consume the entire display (180) of the computing device (152) as illustrated in FIG. 2 and FIG. 3. Selecting a location on a user interface for the second application (186) to place one or more of the active elements of the user interface for the first application (184) may be carried out, for example, by identifying the areas of the user interface for the second application (186) that include no active elements. For example, the portions of the user interface for the second application (186) that include no control elements and no dynamically updated elements may be selected as a location on the user interface for the second application (186) to place one or more of the active elements of the user interface for the first application (184). In such a way, the active elements of the user interface for the first application (184) may be overlaid onto the areas of the user interface for the second application (186) that only include static content.

Selecting a location on a user interface for a second application (186) to place one or more of the active elements of the user interface for the first application (184) may be carried out by examining the source code for the user interface for the second application (186). The source code may include clickable elements that are used to invoke some action. In such an example, the clickable elements that are used to invoke some action may be excluded from selection as locations on the user interface for the second application (186) to place one or more of the active elements of the user interface for the first application (184) by virtue of their ability to control what is displayed in the user interface for the second application (186). Alternatively, selecting a location on a user interface for the second application (186) to place one or more of the active elements of the user interface for the first application (184) may also be carried out by monitoring the content presented by the user interface for the second application (186) to identify those portions of the user interface for the second application (186) that include content that is not updated periodically. In such an example, the portions of the user interface for the second application (186) that include content that is not updated periodically may be selected as locations on the user interface for the second application (186) to place one or more of the active elements of the user interface for the first application (184) by virtue of their stagnant nature.

In the example of FIG. 1, the overlay management module (126) can further carry out collaborative overlay of user interface elements rendered on the display (180) of the computing device (152) by displaying the one or more of the active elements of the user interface for the first application (184) at the selected location on the user interface for the second application (186). Displaying the one or more of the active elements of the user interface for the first application (184) at the selected location on the user interface for the second application (186) may be carried out, for example, modifying the source code of the user interface for the second application (186) to include the source code of the one or more of the active elements of the user interface for the first application (184). The source code of the one or more of the active elements of the user interface for the first application (184) may be modified so as to place the active elements of the user interface for the first application (184) in the selected location on the user interface for the second application (186). In such a way, the one or more of the active elements of the user interface for the first application (184) effectively become active elements of the user interface for the second application (186).

Also stored in RAM (168) is an operating system (154). Operating systems useful collaborative overlay of user interface elements rendered on the display (180) of the computing device (152) according to embodiments of the present invention include UNIX™, Linux™, Microsoft XP™, AIX™, IBM's i5/OS™, Apple™ iOS, Android OS, and others as will occur to those of skill in the art. The operating system (154) and the overlay management module (126) in the example of FIG. 1 are shown in RAM (168), but many components of such software typically are stored in non-volatile memory also, such as, for example, on a disk drive (170).

The computing device (152) of FIG. 1 includes disk drive adapter (172) coupled through expansion bus (160) and bus adapter (158) to processor (156) and other components of the computing device (152). Disk drive adapter (172) connects non-volatile data storage to the computing device (152) in the form of disk drive (170). Disk drive adapters useful in computers for collaborative overlay of user interface elements rendered on the display (180) of the computing device (152) according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computing device (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards, mice, touchscreen displays, and so on. The example computing device (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example computing device (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, through mobile communications networks, and in other ways as will occur to those of skill in the art. Communications adapters implement the hardware level of data communications through which one computer sends data communications to another computer, directly or through a data communications network. Examples of communications adapters useful for collaborative overlay of user interface elements rendered on the display (180) of the computing device (152) according to embodiments of the present invention include modems for wired dial-up communications, Ethernet (IEEE 802.3) adapters for wired data communications network communications, and 802.11 adapters for wireless data communications network communications.

For further explanation, FIG. 2 sets forth a diagram of a computing device (152) configured for collaborative overlay of user interface elements rendered on the display (180) of the computing device (152) according to embodiments of the present invention. The computing device (152) of FIG. 2 may be embodied, for example, as a mobile communications device, smartphone, tablet computer, and so on. The display (180) of FIG. 2 may be embodied, for example, as a touchscreen display upon which a user of the computing device (152) can generate user input and otherwise interact with the computing device (152) by touching the display (180). The example computing device (152) of FIG. 2 can include an overlay management module (126) and the computer hardware components illustrated in the example of FIG. 1. In the example of FIG. 2, the computing device (152) is rendering the user interface of a first application (200) on the display (180). In the example of FIG. 2, the first application is a music playing application that can be used to play digital audio files stored in memory of the computing device (152) or otherwise accessible to the computing device (152).

In the example of FIG. 2, the user interface of the first application (200) includes four active elements (202, 204, 206, 208). The active elements (202, 204, 206, 208) of FIG. 2 are embodied as icons that are used to control the operation of the music playing application. One active element (202) includes a 'rewind' control that enables a user to select a previously played song. Another active element (204) includes a 'play' control that enables a user to play a currently selected song. Another active element (206) includes a 'pause' control that enables a user to pause a currently playing song. Another active element (208) includes a 'seek' control that enables a user to skip past a currently playing song. In the example of FIG. 2, each of the active elements (202, 204, 206, 208) are active in the sense that elements are control elements that allow a user to control the operation of the computing device (152).

For further explanation, FIG. 3 sets forth a diagram of a computing device (152) configured for collaborative overlay of user interface elements rendered on the display (180) of the computing device (152) according to embodiments of the present invention. The computing device (152) of FIG. 3 may be embodied, for example, as a mobile communications device, smartphone, tablet computer, and so on. The display (180) of FIG. 3 may be embodied, for example, as a touchscreen display upon which a user of the computing device (152) can generate user input and otherwise interact with the computing device (152) by touching the display (180). The example computing device (152) of FIG. 3 can include an overlay management module (126) and the computer hardware components illustrated in the example of FIG. 1. In the example of FIG. 3, the computing device (152) is rendering the user interface of a second application (300) on the display (180). In the example of FIG. 3, the second application is web browser configured to display network accessible content. In this example, the user interface of the second application (300) is displaying web page for a sports related website.

In the example of FIG. 3, the user interface of the second application (300) includes four active elements (302, 304, 306, 308). The active elements (302, 304, 306, 308) of FIG. 3 are embodied as hyperlinks to a network accessible resource. In the example of FIG. 3, each of the active elements (302, 304, 306, 308) are active in the sense that elements are control elements that allow a user to control the operation of the computing device (152) by causing the computing device (152) to display network accessible content associated with each hyperlink.

Figure 4:
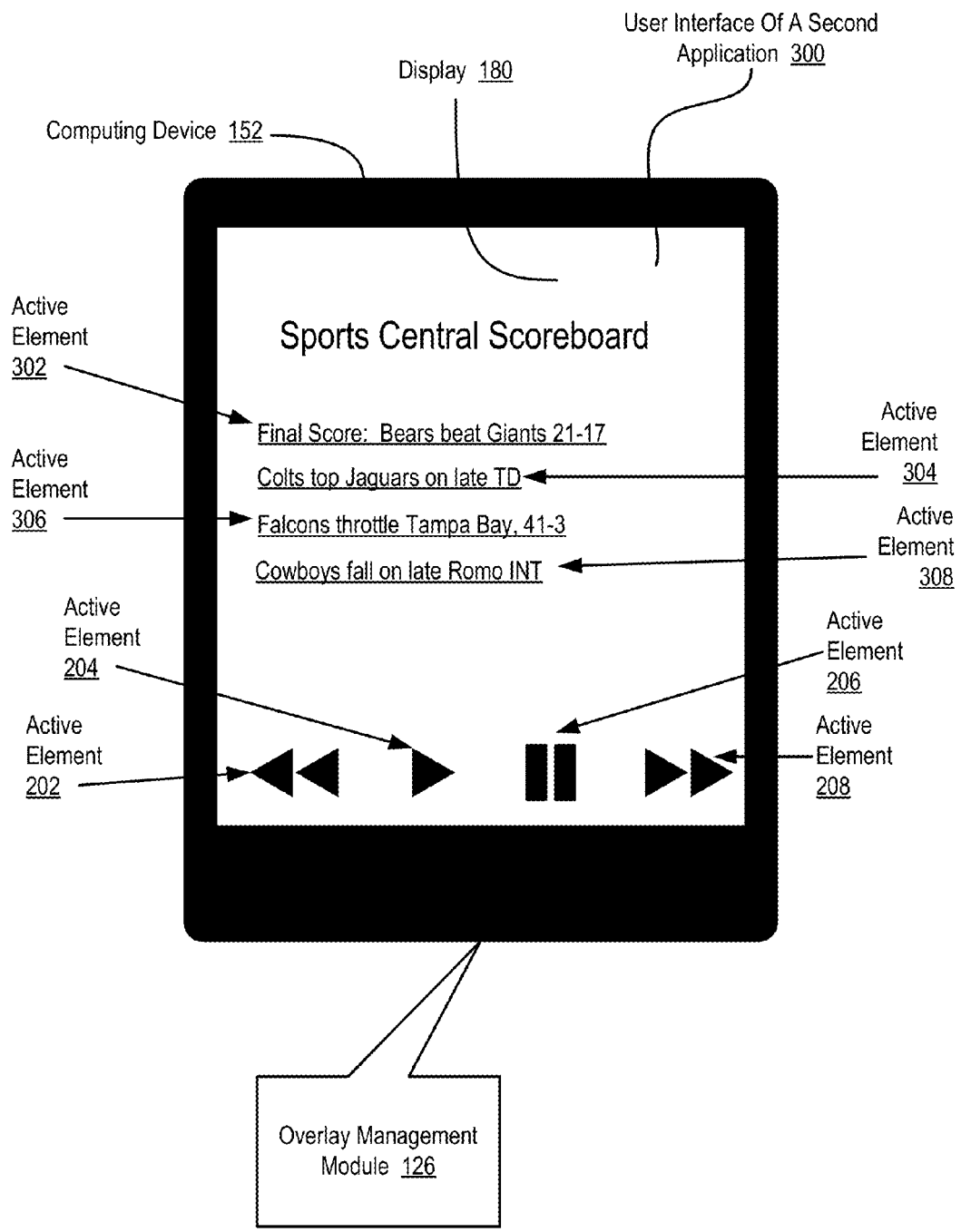
FIG. 4 sets forth a diagram of a computing device configured for collaborative overlay of user interface elements rendered on the display of the computing device according to embodiments of the present invention.

For further explanation, FIG. 4 sets forth a diagram of a computing device (152) configured for collaborative overlay of user interface elements rendered on the display (180) of the computing device (152) according to embodiments of the present invention. The computing device (152) of FIG. 4 may be embodied, for example, as a mobile communications device, smartphone, tablet computer, and so on. The display (180) of FIG. 4 may be embodied, for example, as a touchscreen display upon which a user of the computing device (152) can generate user input and otherwise interact with the computing device (152) by touching the display (180). The example computing device (152) of FIG. 4 can include an overlay management module (126) and the computer hardware components illustrated in the example of FIG. 1.

In the example of FIG. 4, the computing device (152) is rendering the active elements (202, 204, 206, 208) of the user interface of a first application (200 of FIG. 2) on the display (180). The first application is a music playing application that can be used to play digital audio files stored in memory of the computing device (152) or otherwise accessible to the computing device (152). The active elements (202, 204, 206, 208) of FIG. 4 are embodied as icons that are used to control the operation of the music playing application. One active element (202) includes a 'rewind' control that enables a user to select a previously played song. Another active element (204) includes a 'play' control that enables a user to play a currently selected song. Another active element (206) includes a 'pause' control that enables a user to pause a currently playing song. Another active element (208) includes a 'seek' control that enables a user to skip past a currently playing song. In the example of FIG. 4, each of the active elements (202, 204, 206, 208) are active in the sense that elements are control elements that allow a user to control the operation of the computing device (152).

In the example of FIG. 4, the computing device (152) is also rendering the user interface of a second application (300) on the display (180). In the example of FIG. 4, the second application is web browser configured to display network accessible content. In this example, the user interface of the second application (300) is displaying web page for a sports related website. The user interface of the second application (300) includes four active elements (302, 304, 306, 308). The active elements (302, 304, 306, 308) of FIG. 4 are embodied as hyperlinks to a network accessible resource. In the example of FIG. 4, each of the active elements (302, 304, 306, 308) are active in the sense that elements are control elements that allow a user to control the operation of the computing device (152) by causing the computing device (152) to display network accessible content associated with each hyperlink.

The example of FIG. 4 illustrates an example in which the active elements (202, 204, 206, 208) of one application are overlaid onto the user interface of a second application (300). Readers will appreciate that in various embodiments the active elements for additional applications may also be overlaid onto the user interfaces of the second application (300). That is, any application may serve as the base interface with any number additional applications including active elements that are overlaid on top of the base interface.

Figure 5:
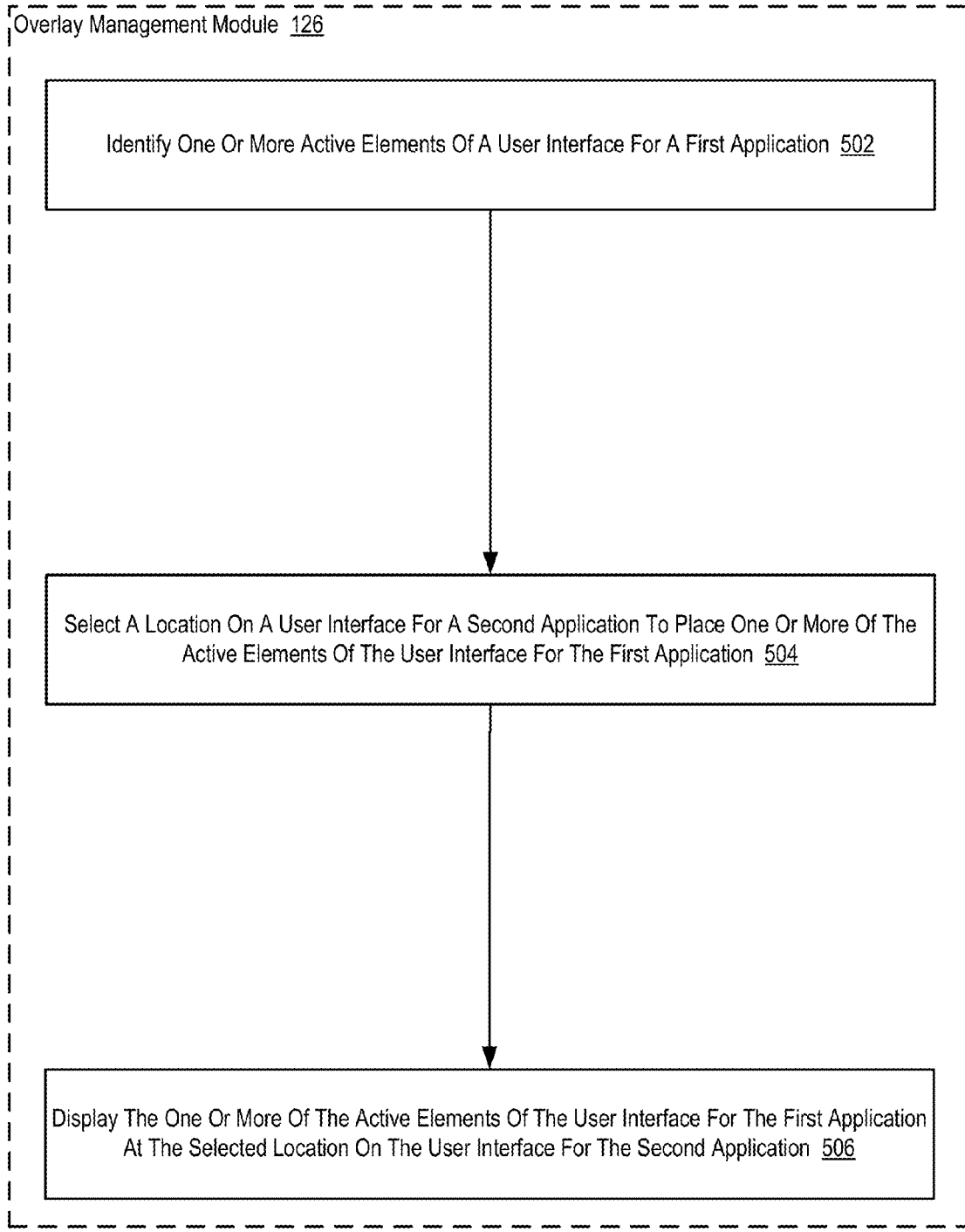
FIG. 5 sets forth a flow chart illustrating an example method for collaborative overlay of user interface elements rendered on the display of a computing device according to embodiments of the present invention.

For further explanation, FIG. 5 sets forth a flow chart illustrating an example method for collaborative overlay of user interface elements rendered on the display of a computing device according to embodiments of the present invention. The example method of FIG. 5 is carried out by an overlay management module (126). The overlay management module (126) of FIG. 5 may be embodied, for example, as computer program instructions executing on computer hardware such as a computer processor.

The example method of FIG. 5 includes identifying (502), by an overlay management module (126), one or more active elements of a user interface for a first application. In the example method of FIG. 5, the one or more active elements of a user interface can include those elements of a user interface that facilitate dynamic interaction between a user of the application and the application itself For example, the one or more active elements of the user interface can include control elements of the user interface that are used to initiate some such of action. Examples of such control elements could include a 'play' icon for a music playing application, a text box for entering an address into a mapping application, and so on. The one or more active elements of a user interface can also include portions of the user interface that are dynamically updated. Examples of portions of the user interface that are dynamically updated can include a portion of mapping application that displays a map that periodically updated, a portion of a video rendering application that displays the video content, and so on.

In the example method of FIG. 5, identifying (502) one or more active elements of a user interface for a first application may be carried out, for example, by examining the source code for the user interface for the first application. The source code may include clickable elements that are used to invoke some action. In such an example, the clickable elements that are used to invoke some action may be determined to be active elements by virtue of their ability to control what is displayed in the user interface. Alternatively, identifying (502) one or more active elements of a user interface for a first application may also be carried out by monitoring the content presented by the user interface to identify those portions of the user interface that include content that is updated periodically. In such an example, the portions of the user interface that include content that is updated periodically may be determined to be active elements by virtue of the fact that they are dynamically updated to present some information to a user.

The example method of FIG. 5 also includes selecting (504), by the overlay management module (126), a location on a user interface for a second application to place one or more of the active elements of the user interface for the first application. In the example method of FIG. 5, the user interface for the second application and the user interface for the first application are designed to be displayed in overlapping portions of the display for the computing device. For example, the user interface for each application may be designed to consume the entire display of the computing device as illustrated in FIG. 2 and FIG. 3. In the example method of FIG. 5, selecting (504) a location on a user interface for a second application to place one or more of the active elements of the user interface for the first application may be carried out, for example, by identifying the areas of the user interface for the second application that include no active elements. For example, the portions of the user interface for the second application that include no control elements and no dynamically updated elements may be selected (504) as a location on the user interface for the second application to place one or more of the active elements of the user interface for the first application. In such a way, the active elements of the user interface for the first application may be overlaid onto the areas of the user interface for the second application that only include static content.

In the example method of FIG. 5, selecting (504) a location on a user interface for a second application to place one or more of the active elements of the user interface for the first application may be carried out by examining the source code for the user interface for the second application. The source code may include clickable elements that are used to invoke some action. In such an example, the clickable elements that are used to invoke some action may be excluded from selection as locations on the user interface for the second application to place one or more of the active elements of the user interface for the first application by virtue of their ability to control what is displayed in the user interface. Alternatively, selecting (504) a location on a user interface for a second application to place one or more of the active elements of the user interface for the first application may also be carried out by monitoring the content presented by the user interface to identify those portions of the user interface that include content that is not updated periodically. In such an example, the portions of the user interface that include content that is not updated periodically may be selected (504) as locations on the user interface for the second application to place one or more of the active elements of the user interface for the first application by virtue of their stagnant nature.

The example method of FIG. 5 also includes displaying (506), by the overlay management module (126), the one or more of the active elements of the user interface for the first application at the selected location on the user interface for the second application. In the example method of FIG. 5, displaying (506) the one or more of the active elements of the user interface for the first application at the selected location on the user interface for the second application may be carried out, for example, modifying the source code of the user interface for the second application to include the source code of the one or more of the active elements of the user interface for the first application. The source code of the one or more of the active elements of the user interface for the first application may be modified so as to place the active elements of the user interface for the first application in the selected location on the user interface for the second application. In such a way, the one or more of the active elements of the user interface for the first application effectively become active elements of the user interface for the second application.

Figure 6:
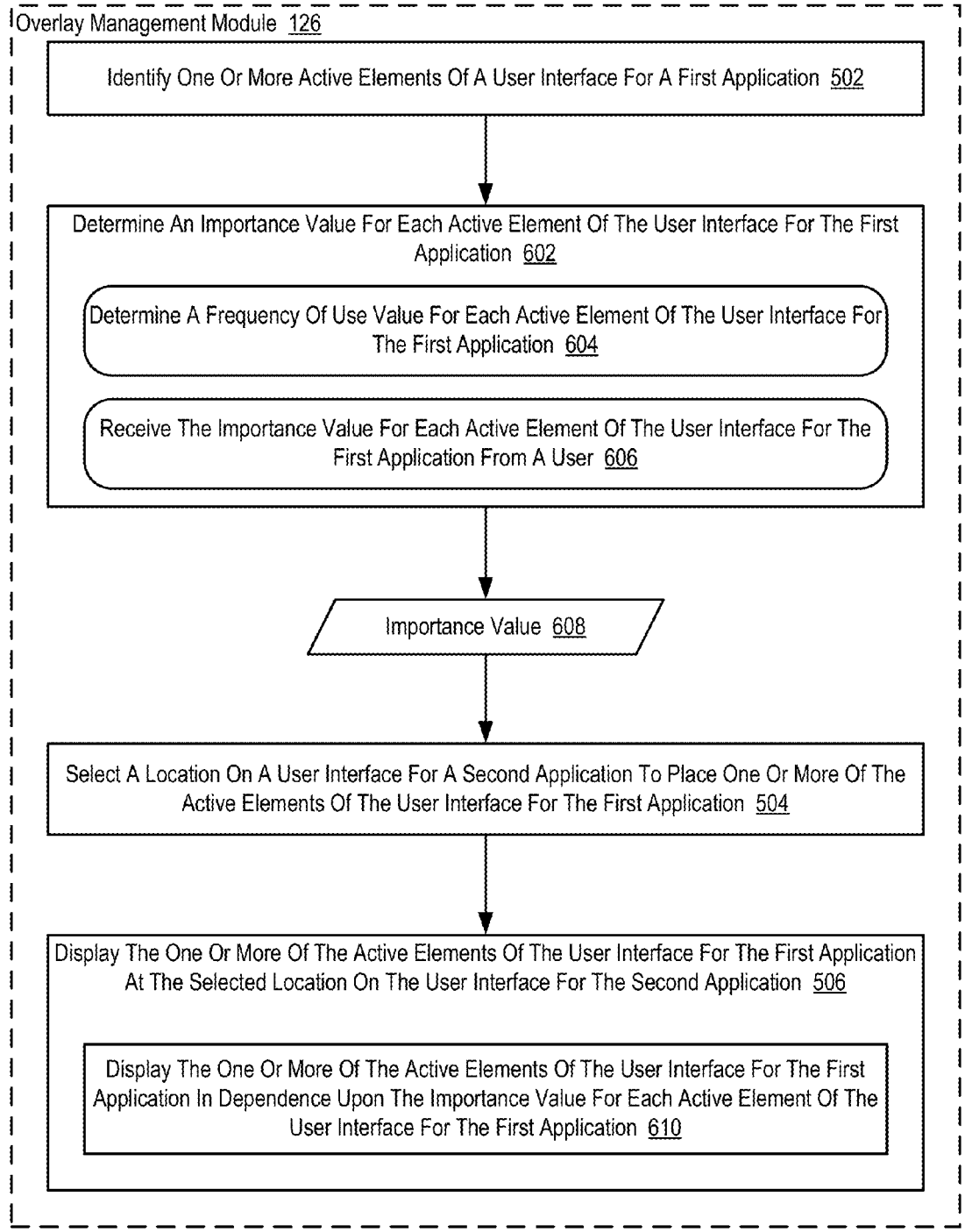
FIG. 6 sets forth a flow chart illustrating a further example method for collaborative overlay of user interface elements rendered on the display of a computing device according to embodiments of the present invention.

For further explanation, FIG. 6 sets forth a flow chart illustrating a further example method for collaborative overlay of user interface elements rendered on the display of a computing device according to embodiments of the present invention. The example method of FIG. 6 is similar to the example method of FIG. 5 as it also includes identifying (502) one or more active elements of a user interface for a first application, selecting (504) a location on a user interface for a second application to place one or more of the active elements of the user interface for the first application, and displaying (506) the one or more of the active elements of the user interface for the first application at the selected location on the user interface for the second application.

The example method of FIG. 6 also includes determining (602), by the overlay management module (126), an importance value (608) for each active element of the user interface for the first application. In the example method of FIG. 6, the importance value (608) for each active element of the user interface for the first application represents a ranking of the relative importance of each active element of the user interface for the first application. In the example method of FIG. 6, the importance value (608) for each active element of the user interface for the first application may be determined, for example, based on the number of times a particular active element is selected or invoked by a user, by using eye tracking technologies to determine the rate at which a user looks at an active element, through the use of user input ranking the importance of each active element, and so on. When determining (602) an importance value (608) for each active element of the user interface for the first application, the overlay management module (126) may also assign more importance to portions of the user interface that are dynamically updated such as, for example, a portion of the user interface that displays a map that is dynamically updated as the location of the computing device changes.

In the example method of FIG. 6, determining (602) the importance value (608) for each active element of the user interface for the first application can include determining (604) a frequency of use value for each active element of the user interface for the first application. In the example method of FIG. 6, the frequency of use value for each active element of the user interface for the first application represents the relative rate at which a user invokes or otherwise selects each active element of the user interface. The frequency of use value for each active element of the user interface may be expressed, for example, as an absolute value indicating the number of times each active element was selected by a user, a value indicating the number of times each active element was selected by a user per unit of time that the active element was available to the user, and so on. In such an example, the frequency of use value for each active element of the user interface for the first application can correspond to the importance value (608) for each active element of the user interface as those active elements of the user interface that are used more frequently can be deemed to be more important and therefore may warrant a higher importance value (608).

In the example method of FIG. 6, determining (602) the importance value (608) for each active element of the user interface for the first application can include receiving (606) the importance value (608) for each active element of the user interface for the first application from a user. In the example method of FIG. 6, the importance value (608) for each active element of the user interface for the first application may be received (608) from a user of the computing device, for example, through the use of a graphical user interface that enables a user to rank the relative importance of each active element of the user interface for the first application. The importance value (608) for each active element of the user interface for the first application may therefore be user selected such that a user can effectively determine when active elements of the user interface for the first application should receive priority when being overlaid on the user interface of the second application.

In the example method of FIG. 6, displaying (506) the one or more of the active elements of the user interface for the first application at the selected location on the user interface for the second application can include displaying (610) the one or more of the active elements of the user interface for the first application in dependence upon the importance value (608) for each active element of the user interface for the first application. In the example method of FIG. 6, displaying (610) the one or more of the active elements of the user interface for the first application in dependence upon the importance value (608) for each active element of the user interface for the first application may be carried out, for example, by displaying (610) a only a predetermined number of the one or more of the active elements of the user interface for the first application that are associated with the highest importance value (608). Alternatively, displaying (610) the one or more of the active elements of the user interface for the first application in dependence upon the importance value (608) for each active element of the user interface for the first application may also be carried out by iteratively displaying the active element with the highest importance value (608) until there is no additional space available on the user interface of the second application for overlaying active elements of the user interface for the first application.

Figure 7:
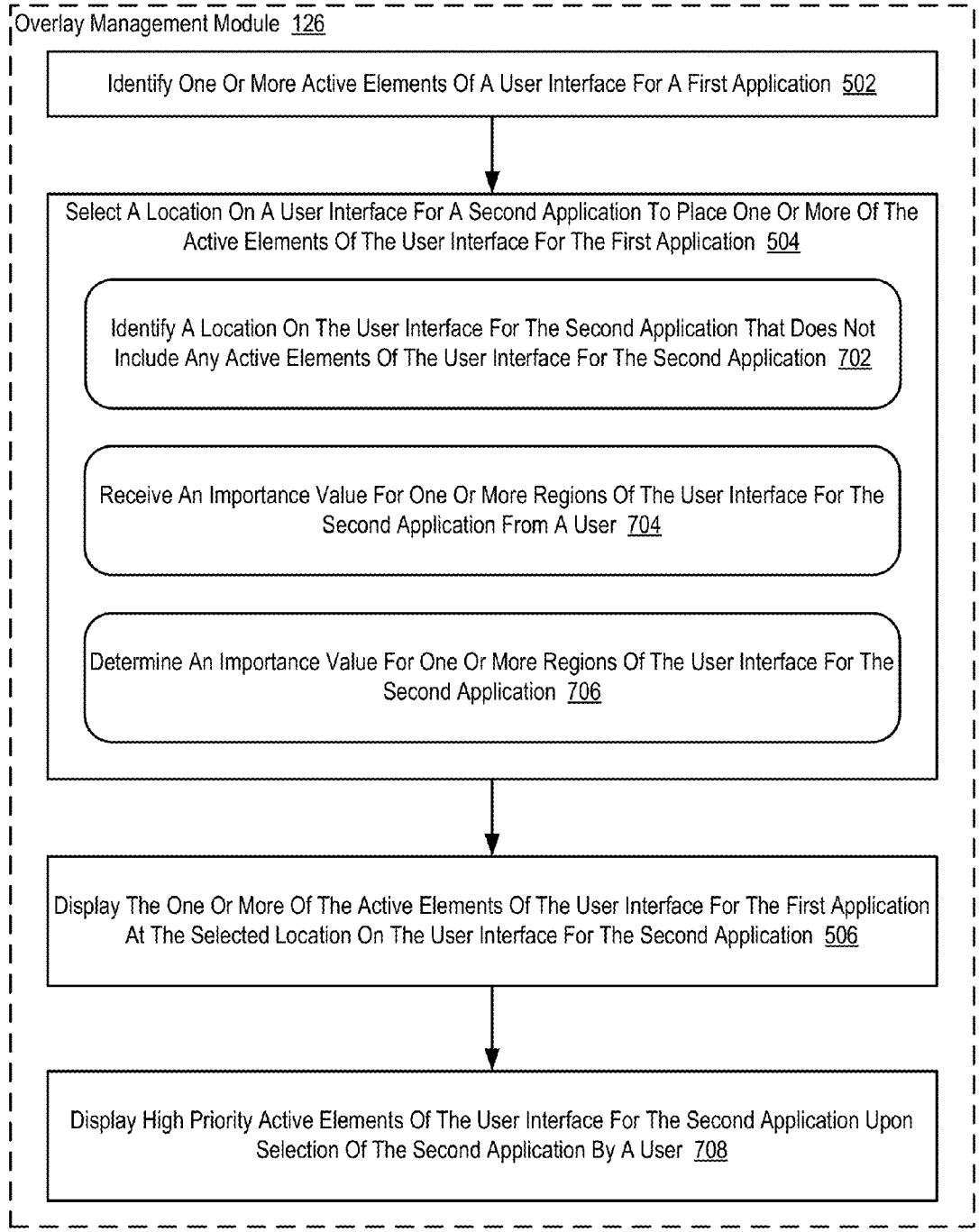
FIG. 7 sets forth a flow chart illustrating a further example method for collaborative overlay of user interface elements rendered on the display of a computing device according to embodiments of the present invention.

For further explanation, FIG. 7 sets forth a flow chart illustrating a further example method for collaborative overlay of user interface elements rendered on the display of a computing device according to embodiments of the present invention. The example method of FIG. 7 is similar to the example method of FIG. 5 as it also includes identifying (502) one or more active elements of a user interface for a first application, selecting (504) a location on a user interface for a second application to place one or more of the active elements of the user interface for the first application, and displaying (506) the one or more of the active elements of the user interface for the first application at the selected location on the user interface for the second application.

In the example method of FIG. 7, selecting (504) a location on a user interface for a second application to place one or more of the active elements of the user interface for the first application can include identifying (702) a location on the user interface for the second application that does not include any active elements of the user interface for the second application. In the example method of FIG. 7, a location on the user interface for the second application that does not include any active elements of the user interface for the second application can include those portions of the user interface that display static content, no content, or otherwise include no control elements. Identifying (702) a location on the user interface for the second application that does not include any active elements of the user interface for the second application may be carried out by examining the source code for the user interface for the second application. The source code may include clickable elements that are used to invoke some action. In such an example, the clickable elements that are used to invoke some action may be excluded from selection as locations on the user interface for the second application to place one or more of the active elements of the user interface for the first application by virtue of their ability to control what is displayed in the user interface. Alternatively, identifying (702) a location on the user interface for the second application that does not include any active elements of the user interface for the second application may also be carried out by monitoring the content presented by the user interface to identify those portions of the user interface that include content that is not updated.

In the example method of FIG. 7, selecting (504) a location on a user interface for a second application to place one or more of the active elements of the user interface for the first application can also include receiving (704) an importance value for one or more regions of the user interface for the second application from a user. In the example method of FIG. 7, the importance value for one or more regions of the user interface for the second application can represent a relative importance level of each portion of the user interface for the second application. Those portions of the user interface for the second application that are less important may represent candidate areas for overlaying one or more active elements of the user interface of the first application. In the example method of FIG. 7, a particular portion of the user interface for the second application may be unimportant, for example, if the portion of the user interface for the second application includes only static content that need not be visible to use the second application. For example, in a music playing application, the control elements of the user interface may be more important that portions of the user interface that display the album cover for a particular song that is being played by the music playing application.

In the example method of FIG. 7, receiving (704) an importance value for one or more regions of the user interface for the second application from a user may be carried out, for example, through the use of a graphical user interface that allows a user to identify one or more regions of the user interface for the second application and rank the relative importance of each region. In such a way, the user can effectively select the portions of the user interface for the second application that may be candidate regions for overlaying active elements of the user interface for the first application.

In the example method of FIG. 7, selecting (504) a location on a user interface for a second application to place one or more of the active elements of the user interface for the first application can also include determining (706) an importance value for one or more areas of the user interface for the second application. In the example method of FIG. 7, determining (706) an importance value for one or more areas of the user interface for the second application may be carried out, for example, by determining the amount of control elements rendered in each area of the user interface for the second application, by determining the frequency at which content rendered in each area of the user interface for the second application is updated, by determining the frequency at which a user selects some element in each area of the user interface for the second application, and so on. In such a way, those regions that are more densely populated with control elements for the second application, and those regions that are more frequently updated with content rendered by the second application, may be deemed to be more important than other regions of the user interface for the second application and therefore should not be overlaid with active elements of the user interface for the first application.

The example method of FIG. 7 also includes displaying (708), by the overlay management module (126), high priority active elements of the user interface for the second application upon selection of the second application by a user. Consider an example in which a user interface for a first application is being displayed by a computing device such as a smartphone that includes a touchscreen display. In such an example, some region of the user interface for the first application may be available for overlaying active elements associated with additional applications. Examples of such active elements that may be overlaid onto the selected region of the first application can include, for example, an icon used to invoke one of the additional applications. In such an example, active elements for multiple applications may be placed at the selected location of the user interface for the first application and one of the additional applications may be selected, for example, by a user touching the region of the touchscreen display at which an icon associated with one of the additional applications is displayed. Upon selection of one of the additional applications, high priority active elements of the user interface for the selected application may be displayed. Such high priority active elements can include, for example, active elements used to control various aspects of the selected application. In the example of FIG. 7, displaying (708) high priority active elements of the user interface for the selected application can cause the high priority active elements of the user interface for the selected application to take precedence over active elements associates with other applications, such that displaying (708) high priority active elements of the user interface for the selected application can result the active elements of unselected applications being removed.

Figure 8:
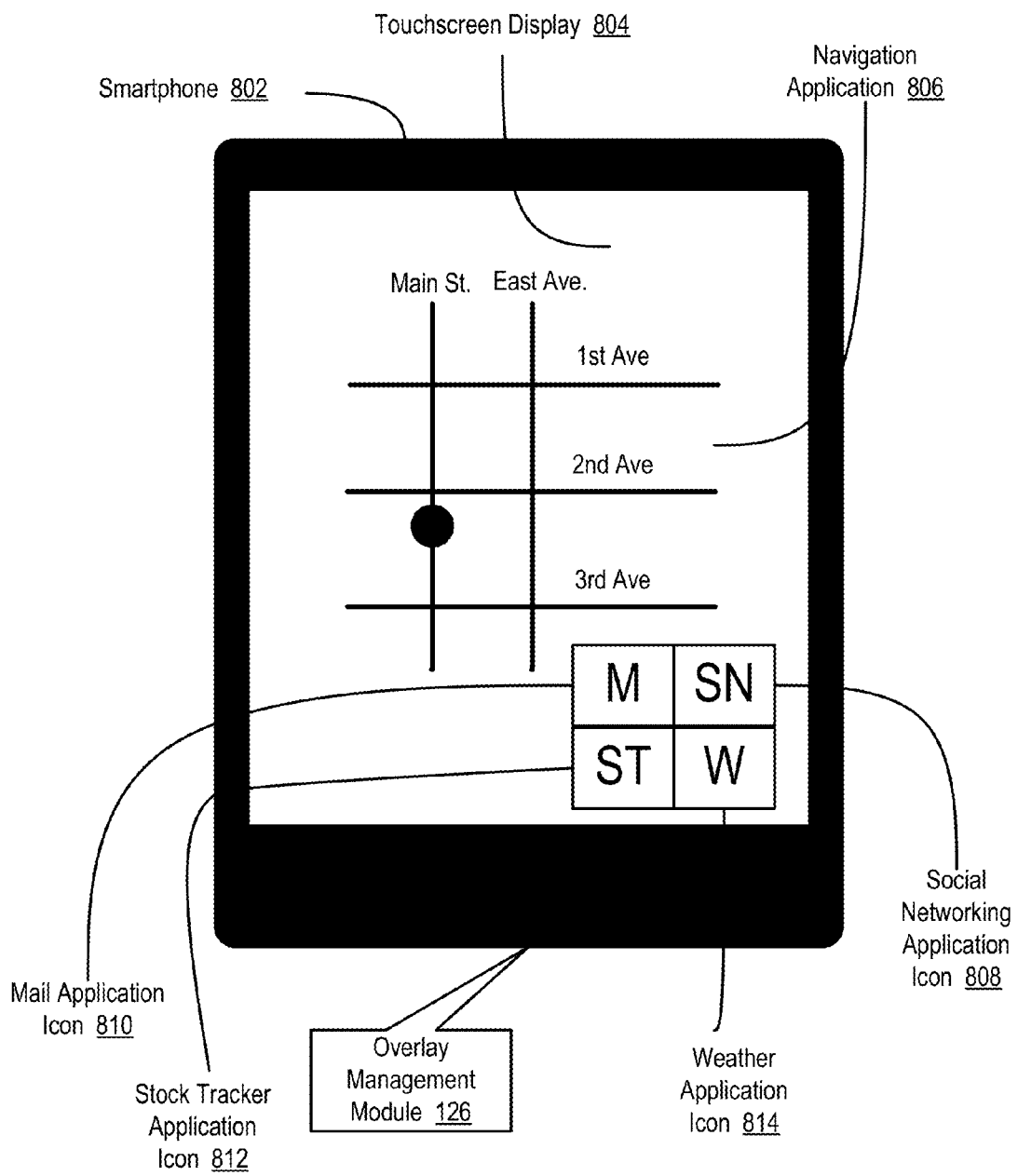
FIG. 8 sets for an example smartphone in which high priority active elements of a user interface for a second application are displayed according to embodiments of the present invention.

For further explanation, FIG. 8 sets for an example smartphone (802) in which high priority active elements of a user interface for a second application are displayed. In the example method of FIG. 8, the smartphone (802) includes a touchscreen display (804) and the overlay management module (126) described above. In the example of FIG. 8, a navigation application (806) for providing driving directions to a user is displayed on the touchscreen display (804) of the smartphone. In such an example, a particular region of the user interface for the navigation application (806) may be available for overlaying active elements associated with additional applications supported by the smartphone (802). For example, icons for a social networking application (808), a mail application (810), a stock tracker application (812), and a weather application (814) may be displayed at the available region of the user interface for the navigation application (806). If a user selects the social networking application, for example, by touching the location on a touchscreen display at which the social networking application icon (808) is displayed, high priority active elements associated with the social networking application can be displayed.

Figure 9:
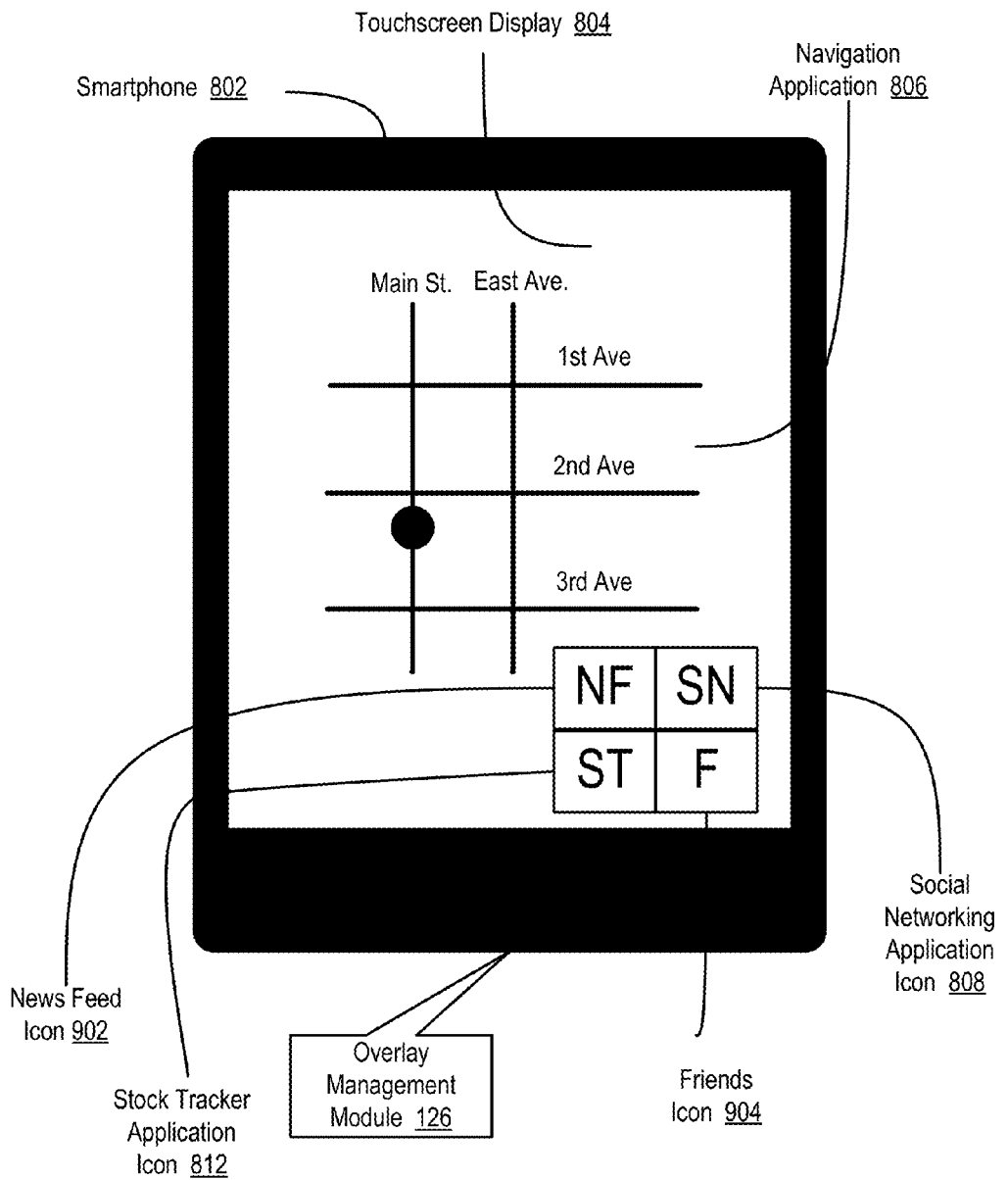
FIG. 9 sets for an example smartphone in which high priority active elements of a user interface for a second application are displayed according to embodiments of the present invention.

For further explanation, FIG. 9 sets for an example smartphone (802) in which high priority active elements of a user interface for a second application are displayed. In the example of FIG. 9, the high priority active elements of the selected social networking application (808) are displayed. The high priority active elements associated with the social networking application (808) may include the features of the social networking application that are most frequently used by the user. For example, the high priority active elements associated with the social networking application (808) may include a news feed icon (902) for tracking status updates for friends and a friends icon (904) for identifying friends that are also registered with the social networking site. In the example of FIG. 9, a news feed icon (902) and friends icon (904) associated with the social networking application (808) are displayed in response to a user selection of the social networking application (808). In such an example, displaying the high priority active elements associated with the social networking application (808) may cause the icon for the mail application (810 of FIG. 8) and the icon for the weather application (814 of FIG. 8) to cease being displayed, as the amount of space at the available region of the user interface for the navigation application (806) may be limited.

Readers will appreciate that displaying high priority active elements associated with a selected application may cause active elements associated with unselected applications to cease to be displayed. Identifying the specific active elements associated with unselected applications that are removed from being displayed can be carried out, for example, according to a predetermined eviction policy. For example, the predetermined eviction policy may specify that the least recently used active elements that are associated with unselected applications may be removed from being displayed in order to create space for displaying the high priority active elements associated with the selected application. Furthermore, if a particular application has multiple active elements displayed, the predetermined eviction policy may specify that the multiple active elements that are associated with an unselected application may be condensed in order to create space for displaying the high priority active elements associated with the selected application.

Consider the example described above in which a social networking application was selected, such that multiple active elements of the social networking application are displayed. Assume that a user subsequently selects an audio rendering application, such that high priority active elements associated with the audio rendering application are to be displayed. In such an example, the multiple active elements of the social networking application may be condensed into a single icon for the social networking application, thereby creating space for displaying the high priority active elements associated with the audio rendering application.

Readers will appreciate that active elements, such as icons, can be displayed for multiple applications and that such active elements may be overlaid onto the user interface of the primary application. The active elements associated with multiple applications may be displayed in a group that can be organized according to a predetermined organization policy. The predetermined organization policy may specify that active elements for similar applications may be grouped together, active elements may be displayed according to the frequency of use, active elements may be organized alphabetically, and in other ways as will occur to those of skill in the art.

Example embodiments of the present invention are described largely in the context of a fully functional computer system for collaborative overlay of user interface elements rendered on the display of a computing device. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. An apparatus comprising a computer processor and a computer memory operatively coupled to the computer processor, the computer memory having disposed within it computer program instructions that, when executed by the computer processor, cause the apparatus to carry out the steps of:
  identifying one or more active elements of a first user interface for a first application including examining source code for the first user interface to identify elements that are used to receive input;
  selecting a location within a second user interface for a second application to place the identified one or more active elements of the first user interface for the first application;
  determining an importance value for each active element of the first user interface for the first application representing a ranking of the relative importance of each active element of the first user interface for the first application;
  displaying, in dependence upon the importance value for each active element of the first user interface, the one or more active elements of the first user interface at the selected location within the second user interface by iteratively displaying an active element with a highest importance value until there is no additional space available on the second user interface for overlaying the one or more active elements of the first user interface for the first application;
  detecting within the second user interface, a plurality of selections of the one or more active elements of the first user interface for the first application and a plurality of selections of one or more active elements of the second user interface for the second application; and
  in response to detecting within the second user interface, the selection of the one or more active elements of the first user interface for the first application, initiating a first action associated with the first application and in response to detecting within the second user interface, the selection of the one or more active elements of the second user interface for the second application, initiating a second action associated with the second application,
  wherein the second user interface including the one or more active elements of the first user interface for the first application and the one or more active elements of the second user interface for the second application consumes the entire display area of the computing device, and the user controls the operations of both the first application and the second application on the computing device by initiating the actions associated with each of the one or more active elements of the first user interface for the first application and the one or more active elements of the second user interface for the second application on one display area of the computing device.

2. The apparatus of claim 1 wherein displaying the one or more active elements of the first user interface for the first application at the selected location within the second user interface includes displaying the one or more active elements of the first user interface in dependence upon the importance value for each active element of the first user interface.

3. The apparatus of claim 2 wherein determining the importance value for each active element of the first user interface includes determining a frequency of use value for each active element of the first user interface for the first application.

4. The apparatus of claim 2 wherein determining the importance value for each active element of the first user interface includes receiving the importance value for each active element of the first user interface from a user.

5. The apparatus of claim 2 wherein identifying the one or more active elements of the first user interface further includes monitoring the content presented by the first user interface to identify portions of the first user interface that include periodically updated content.

6. The apparatus of claim 1 wherein selecting the location within the second user interface to place the identified one or more active elements includes identifying a location within the second user interface that does not include any active elements of the second user interface.

7. The apparatus of claim 1 wherein selecting the location within the second user interface to place the identified one or more active elements includes receiving an importance value for one or more regions of the second user interface from a user.

8. The apparatus of claim 1 wherein selecting the location within the second user interface to place the identified one or more active elements includes determining an importance value for one or more regions of the second user interface.

9. The apparatus of claim 1 further comprising computer program instructions that, when executed by the computer processor, cause the apparatus to carry out the step of displaying high priority active elements of the second user interface in response to a selection of the second application by a user.

10. The apparatus of claim 1 wherein determining the importance value for each active element of the first user interface for the first application includes determining a rate at which a user looks at each active element of the first user interface for the first application.

11. The apparatus of claim 1 wherein determining the importance value for each active element of the first user interface for the first application includes assigning more importance to portions of the user interface that are dynamically updated.

12. The apparatus of claim 1 wherein displaying, in dependence upon the importance value for each active element of the first user interface for the first application, the one or more active elements of the first user interface for the first application at the selected location within the second user interface further includes displaying only a predetermined number of the one or more active elements of the first user interface for the first application.

13. A computer program product including a non-transitory computer readable storage medium, the computer program product comprising computer program instructions that, when executed, cause a computing device to perform operations comprising:
identifying one or more active elements of a first user interface for a first application including examining source code for the first user interface to identify elements that are used to receive input;
selecting a location within a second user interface for a second application to place the identified one or more active elements of the first user interface for the first application;
determining an importance value for each active element of the first user interface for the first application representing a ranking of the relative importance of each active element of the first user interface for the first application;
displaying, in dependence upon the importance value for each active element of the first user interface, the one or more active elements of the first user interface at the selected location within the second user interface by iteratively displaying an active element with a highest importance value until there is no additional space available on the second user interface for overlaying the one or more active elements of the first user interface for the first application;
detecting within the second user interface, a plurality of selections of the one or more active elements of the first user interface for the first application and a plurality of selections of one or more active elements of the second user interface for the second application; and
in response to detecting within the second user interface, the selection of the one or more active elements of the first user interface for the first application, initiating a first action associated with the first application and in response to detecting within the second user interface, the selection of the one or more active elements of the second user interface for the second application, initiating a second action associated with the second application,
wherein the second user interface including the one or more active elements of the first user interface for the first application and the one or more active elements of the second user interface for the second application consumes the entire display area of the computing device, and the user controls the operations of both the first application and the second application on the computing device by initiating the actions associated with each of the one or more active elements of the first user interface for the first application and the one or more active elements of the second user interface for the second application on one display area of the computing device.

14. The computer program product of claim 13 wherein displaying the one or more active elements of the first user interface for the first application at the selected location within the second user interface includes displaying the one or more active elements of the first user interface in dependence upon the importance value for each active element of the first user interface.

15. The computer program product of claim 14 wherein determining the importance value for each active element of the first user interface includes determining a frequency of use value for each active element of the first user interface.

16. The computer program product of claim 14 wherein determining the importance value for each active element of the first user interface includes receiving the importance value for each active element of the first user interface from a user.

17. The computer program product of claim 13 wherein identifying the one or more active elements of the first user interface further includes monitoring the content presented by the first user interface to identify portions of the first user interface that include periodically updated content.

18. A computer-implemented method comprising:
by computer program instructions on a computing device,
identifying one or more active elements of a first user interface for a first application including examining source code for the first user interface to identify elements that are used to receive input;
selecting a location within a second user interface for a second application to place the identified one or more active elements of the first user interface for the first application;
determining an importance value for each active element of the first user interface for the first application representing a ranking of the relative importance of each active element of the first user interface for the first application;
displaying, in dependence upon the importance value for each active element of the first user interface, the one or more active elements of the first user interface at the selected location within the second user interface by iteratively displaying an active element with a highest importance value until there is no additional space available on the second user interface for overlaying the one or more active elements of the first user interface for the first application;
detecting within the second user interface, a plurality of selections of the one or more active elements of the first user interface for the first application and a plurality of selections of one or more active elements of the second user interface for the second application; and
in response to detecting within the second user interface, the selection of the one or more active elements of the first user interface for the first application, initiating a first action associated with the first application and in response to detecting within the second user interface, the selection of the one or more active elements of the second user interface for the second application, initiating a second action associated with the second application,
wherein the second user interface including the one or more active elements of the first user interface for the first application and the one or more active elements of the second user interface for the second application consumes the entire display area of the computing device, and the user controls the operations of both the first application and the second application on the computing device by initiating the actions associated with each of the one or more active elements of the first user interface for the first application and the one or more active elements of the second user interface for the second application on one display area of the computing device.

19. The computer-implemented method of claim 18 wherein displaying the one or more active elements of the first user interface for the first application at the selected location within the second user interface includes displaying the one or more active elements of the first user interface in dependence upon the importance value for each active element of the first user interface.

20. The computer-implemented method of claim 18 further comprising displaying high priority active elements of the second user interface in response to a selection of the second application by a user.

* * * * *